United States Patent [19]

Shibata et al.

[11] Patent Number: 4,741,635
[45] Date of Patent: May 3, 1988

[54] PRINT COMPRESSOR

[75] Inventors: Yoshimitsu Shibata, Okazaki; Tadao Nojiri, Obu, both of Japan

[73] Assignee: Nippondenso Co., Ltd., Kariya, Japan

[21] Appl. No.: 893,085

[22] Filed: Aug. 4, 1986

[30] Foreign Application Priority Data

Aug. 8, 1985 [JP] Japan ................ 60-174693

[51] Int. Cl.⁴ .............................. B41J 3/02
[52] U.S. Cl. .................. 400/121; 340/727; 340/731; 400/124; 400/61
[58] Field of Search .......... 400/121, 124, 61–63, 400/70; 101/93.04, 93.05; 340/724, 727, 731, 735

[56] References Cited

U.S. PATENT DOCUMENTS

| 3,814,227 | 6/1974 | Hurd | 400/121 |
| 3,976,982 | 8/1976 | Eiselen | 340/727 X |
| 4,517,578 | 5/1985 | Tazaki | 400/126 X |
| 4,593,407 | 6/1986 | Konishi | 340/727 X |

FOREIGN PATENT DOCUMENTS

| 129267 | 7/1985 | Japan | 400/121 |
| 149471 | 8/1985 | Japan | 400/121 |
| 151063 | 8/1985 | Japan | 400/121 |

Primary Examiner—Paul T. Sewell
Attorney, Agent, or Firm—Cushman, Darby & Cushman

[57] ABSTRACT

A print compressor connected to a printer for printing output data from a computer or the like so as to selectively change the printer from one mode of printing to another. The output data is stored temporarily and then read in accordance with selected print compression ratio and printing direction thereby converting the data to a corresponding compressed character font. In accordance with the character font, the printer prints characters in compressed form in the selected printing direction.

8 Claims, 11 Drawing Sheets

```
---- PAGE 1 ----
ABCDEFGH
IJKLMNOP
QRSTUVWX
YZ
0
1
2
3
4
5
6
7
---- PAGE 2 ----
8
9
10
11
12
13
14
15
16
17
18
19
---- PAGE 3 ----
20
21
22
23
24
25
26
27
28
29
30
31
```

PRINT COMPRESSOR

BACKGROUND OF THE INVENTION

The present invention relates to a print compressor which selectively effects a change from one mode of printing to another mode, such as a print compression mode, when printing characters by a dot-matrix method in accordance with the character data in an information output from a computer or the like.

In the past, a character-size reducing function has been performed during the printing of characters in accordance with information output from a computer. This function has been exclusively utilized for the purpose of reducing the size of superscripts or subscripts as in, for instance "$X^2$" or "$H_2O$", or simply reducing the size of characters to adjust the number of print lines.

Thus, this conventional printing is disadvantageous in that characters are printed while retaining their pre-reduction image. This has the effect of merely decreasing the rowwise printing space of the printing paper and merely increasing the columnwise space of the printing paper without any more effective utilization of these spaces.

SUMMARY OF THE INVENTION

With a view to overcoming the foregoing deficiencies in the prior art, it is an object of the present invention to provide a print compressor so designed that the character data from a data output equipment such as a computer is printed in a compressed print form which effectively utilizes the printing paper in both directions or columnwise and rowwise and the resulting print is readily legible.

To accomplish the above object, in accordance with the invention there is thus provided a print compressor arranged before a printer of the type which is responsive to the successively generated character data from a data output equipment to print the corresponding characters by a dot-matrix method and the print compressor performs a function of selectively changing the printing operation from one mode to another. Thus, the print compressor includes command means for directing a change of the ratio of print compression and the direction of printing, respectively, working memory means for successively reading in the character data and reading out the stored data in a read-out direction different from the read-in direction, character generating means responsive to the print compression ratio and the printing direction from the command means to convert the data read from the working memory means to the corresponding compressed character font, and control means responsive to the character font to cause the printer to print the corresponding characters in compressed form in the selected printing direction.

In accordance with this construction, the conversion of the character data to the compressed character font through the combination of the working memory means and the character geenerating means changes the compression ratio and printing direction of characters and thus the dot-matrix type printing function of the printer is utilized fully in such a manner that the printing direction of characters is changed to a transverse direction through for example a 90-degree inclination and the characters are printed in compressed form.

BRIEF DESCRIPTION OF THE DRAWINGS

FIG. 7 shows an example of the character font of the character generator.

FIG. 8 shows another example of the character font of the character generator.

FIG. 10 shows a print obtained in a compression printing mode.

DESCRIPTION OF THE PREFERRED EMBODIMENT

Figure 1:
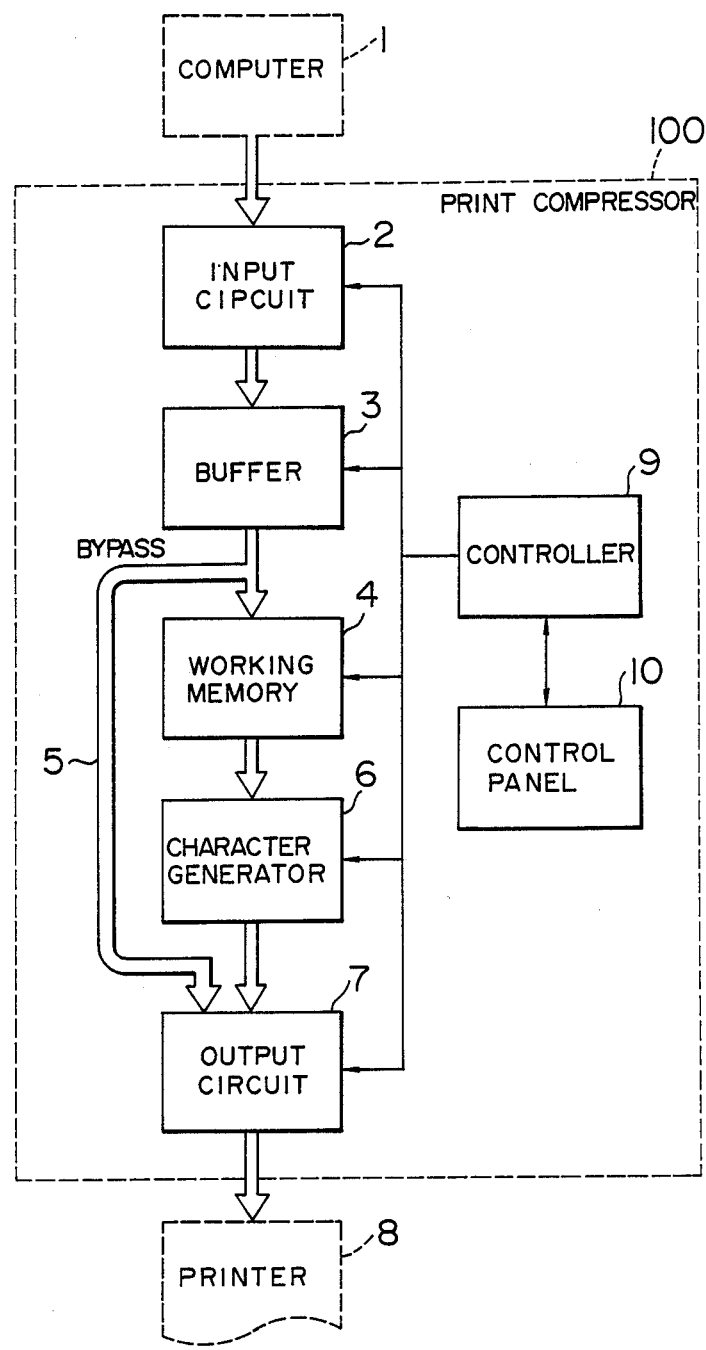
FIG. 1 is a block diagram showing the overall construction of an embodiment of the invention.

Referring to FIG. 1 illustrating a block diagram showing the overall construction of an embodiment of the invention, numeral 1 designates a computer forming a data output equipment for successively generating character data to be printed during the printing. A print compressor 100 is connected to the computer 1.

Numeral 2 designates an input circuit for successively receiving the character data from the computer 1 and delivering the same to a buffer 3. The buffer 3 temporarily stores the character data from the input circuit 2 and has, for example, a storage capacity of 180 kilobytes (corresponding to $1024 \times 180$ characters). Numeral 4 designates a working memory storing information in a matrix form. Some of the data stored in the buffer 3 is character data to be printed. This character data is successively written into working memory 4, in order, in the column direction. Data stored therein is read out in a reading direction (row direction) which is different from the writing direction. Thus, if for example, the compression ratio is 3:1, the buffer 3 has a caacity of storing characters for 3 pages in terms of data before compression, that is, a normal data capacity of 66 columns $\times 132$ characters (per row)$\times 3$ pages. Numeral 5 designates a bypass line which enables bypassing the character data without compressing it. Numeral 6 designates a character generator whereby the data read rowwise from the working memory 4 is converted to a compressed character font which is inclined transversely by 90 degrees. Numeral 7 designates an output circuit whereby the compressed character font from the character generator 6 and the normal character data from the bypass line 5 are selectively received and sent to a printer 8. The printer 8 prints characters in dot-matrix form and the characters are printed by changing the printing direction between the normal direction and another direction such as one inclined transversely by 90 degrees and by changing the print compression ratio.

Numeral 9 designates a controller comprising a microcomputer and forming command means for directing a change of the print compression ratio and the printing direction, respectively. The controller 9 is responsive to various command signals from a control panel 10 including an operating mode indicator to suitably control the input circuit 2, the buffer 3, the working memory 4, the character generator 6 and the output circuit 7 and the desired printing mode corresponding to the applied command signal, such as, the normal printing mode or the compression printing mode inclined by 90 degrees and rendered in compression is selected thereby causing the printer 8 to effect the printing.

Figure 2:
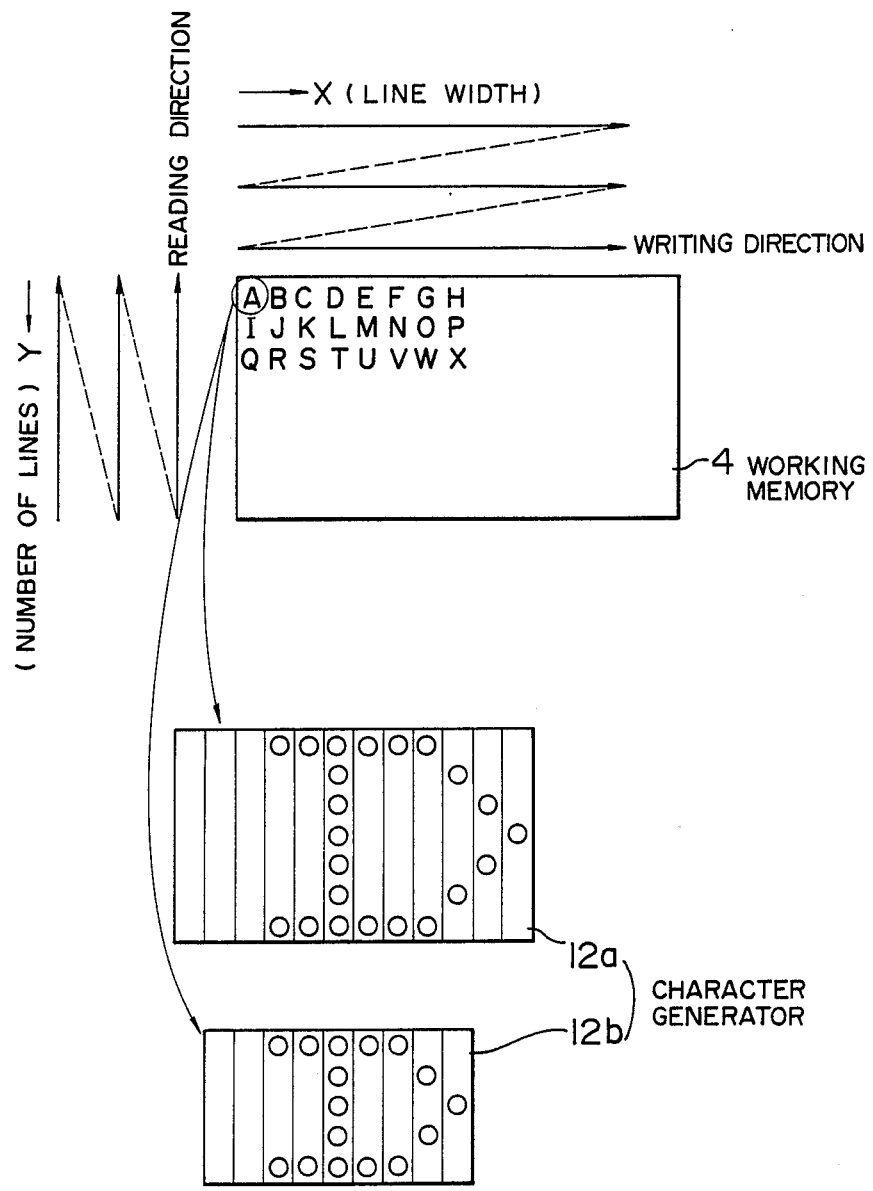
FIG. 2 shows an example of the operation of the working memory in FIG. 1.

FIG. 2 illustrates diagrams for explaining the writing and reading operations of the working memory 4. If, for example, alphabetic characters including A, B, ..., ..., Z are to be printed, the characters are written in a writing direction (e.g., columnwise) and are read out in a reading direction (or rowwise). Therefore, in the case of the character A, either a normal transverse character 12a or a compressed transverse character 12b of a character font inclined by 90° can be produced.

Figure 3:
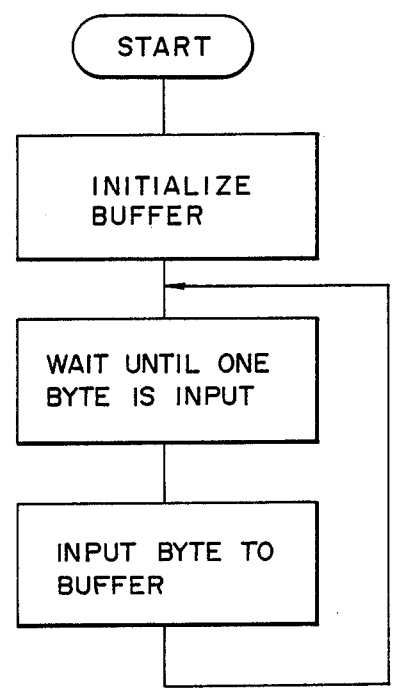
FIG. 3 is a flow chart showing a buffer data inputting process.
Figure 4:
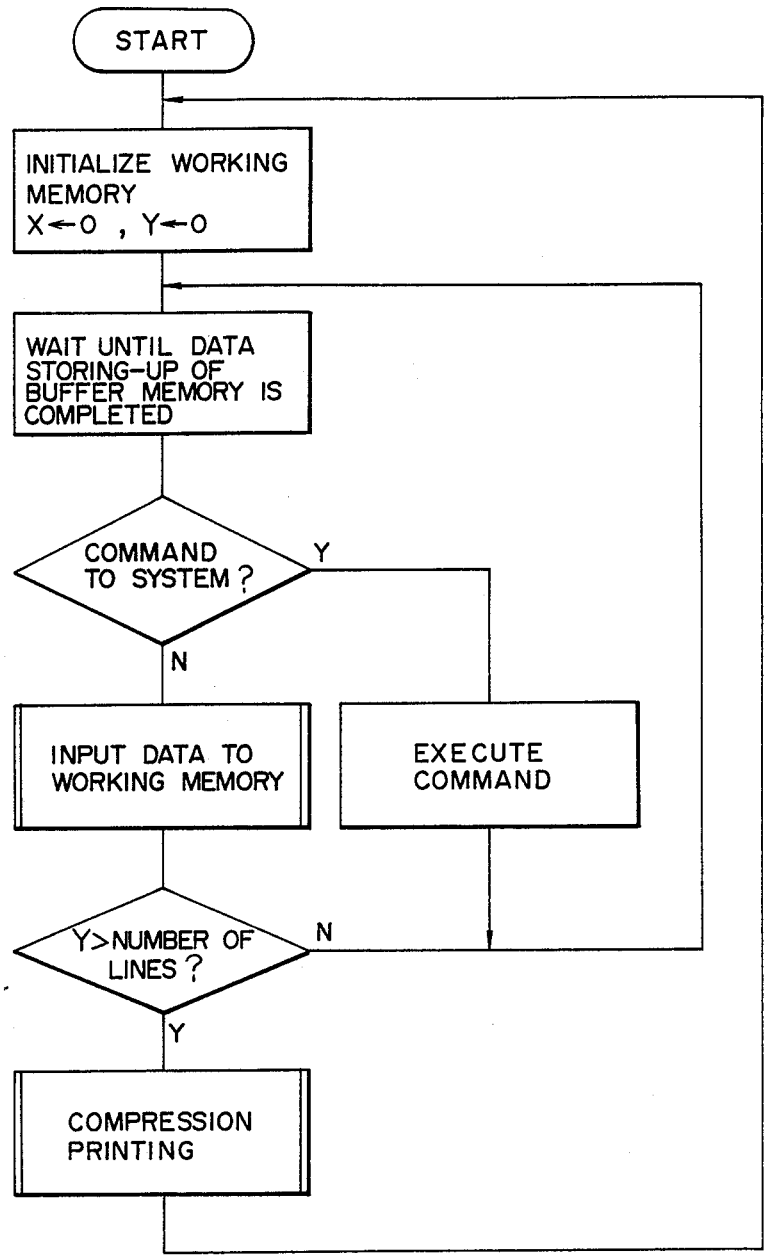
FIG. 4 is a flow chart showing an overall compression printing process.
Figure 5:
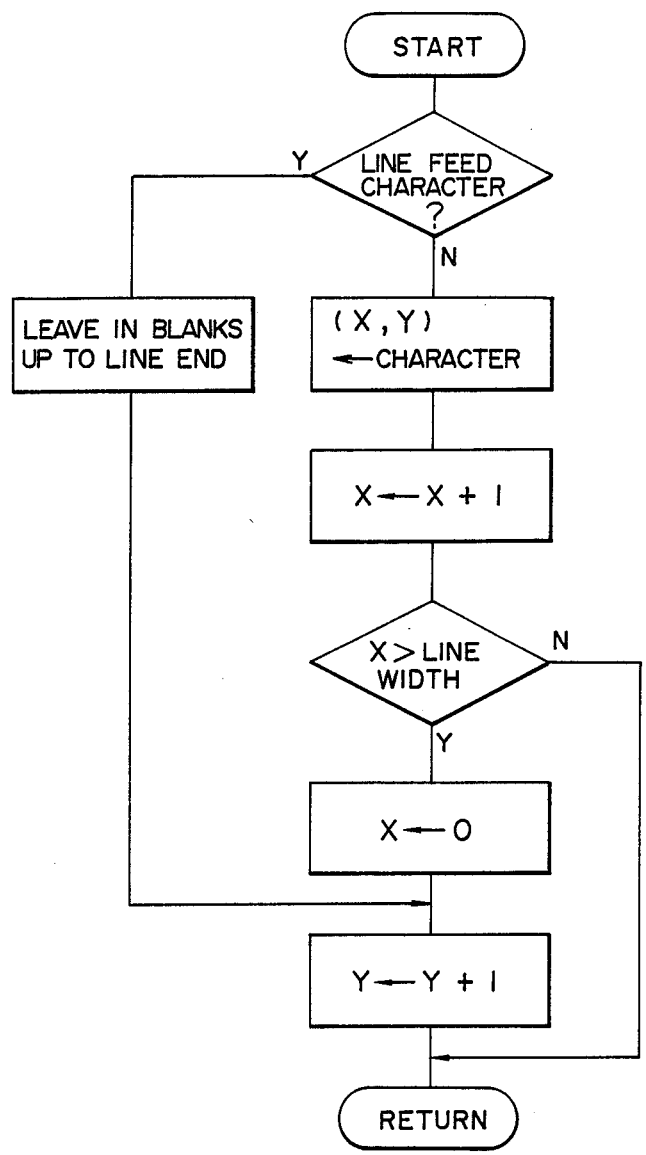
FIG. 5 is a flow chart showing a process of writing a single character into the working memory.

With the above-described construction, the operation of the embodiment will now be described with reference to FIGS. 3 to 10. FIG. 3 is a flow chart showing a data inputting process for the buffer 3 and FIG. 4 is a flow chart showing an overall compression printing process. FIG. 5 is a flow chart showing a process of writing a single character in the working memory 4 and FIG. 6 is a flow chart showing a printing process according to a compression printing program.

Now, the data delivered from the computer 1 is taken in through the input circuit 2 and stored temporarily in the buffer 3. This data inputting operation is performed by executing the inputting process shown by the flow chart of FIG. 3 in accordance with the program in the controller 9. Paralleling this inputting process, of the data stored in the buffer 3 only the character data to be printed is arranged columnwise within the working memory 4.

Then, when the working memory 4 is filled up, a compression printing operation is performed by the computational operations of the data outputting program of FIG. 4. In other words, the operation is performed so that the data written and stored columnwise in the working memory 4 as shown in FIG. 2 is read out rowwise and the direction of printed document is changed by the character generator 6 having a transversely inclined character font.

Figure 6:
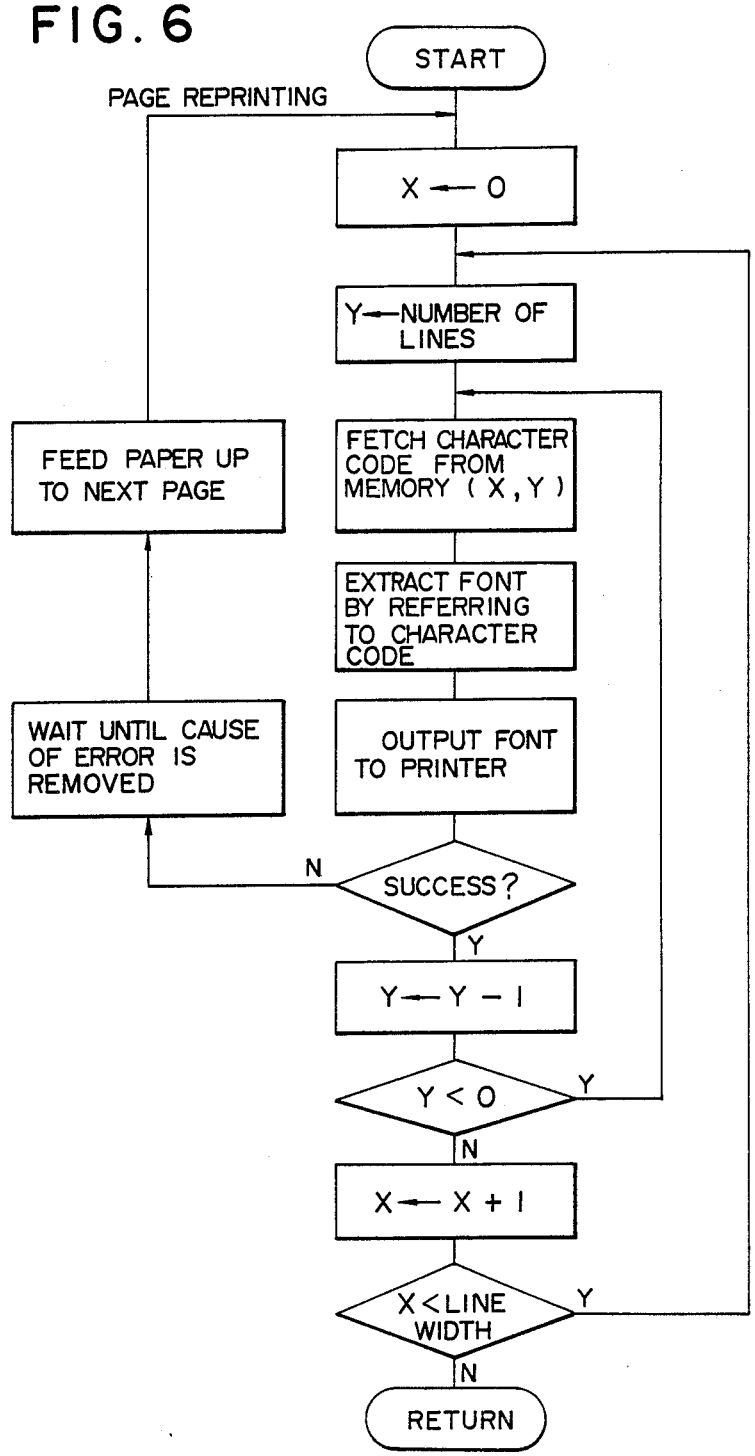
FIG. 6 is a flow chart showing a processing according to a compression printing program.
Figure 7:
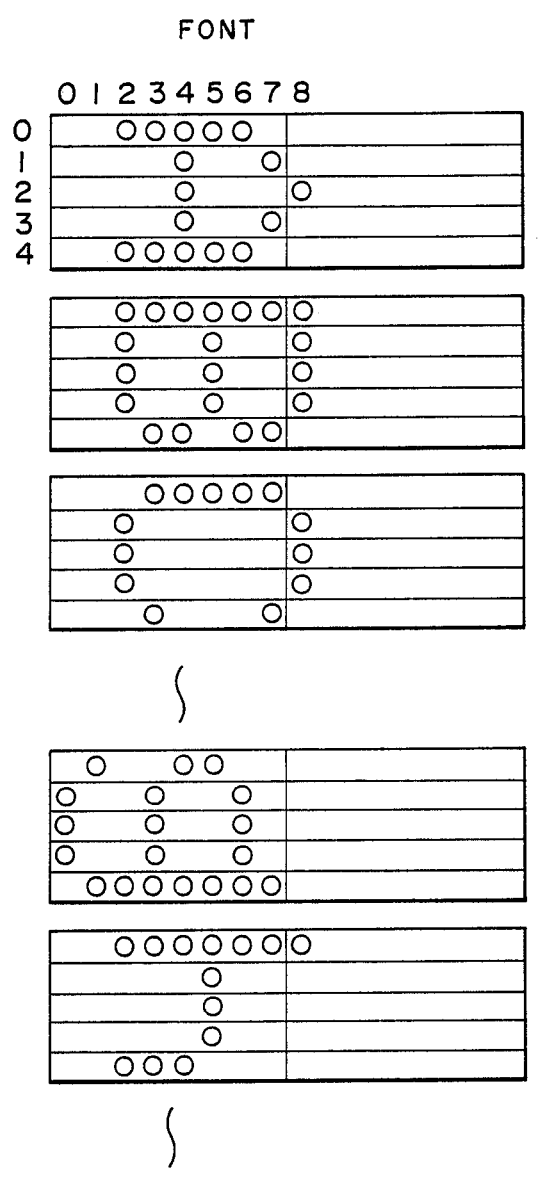
Figure 8:
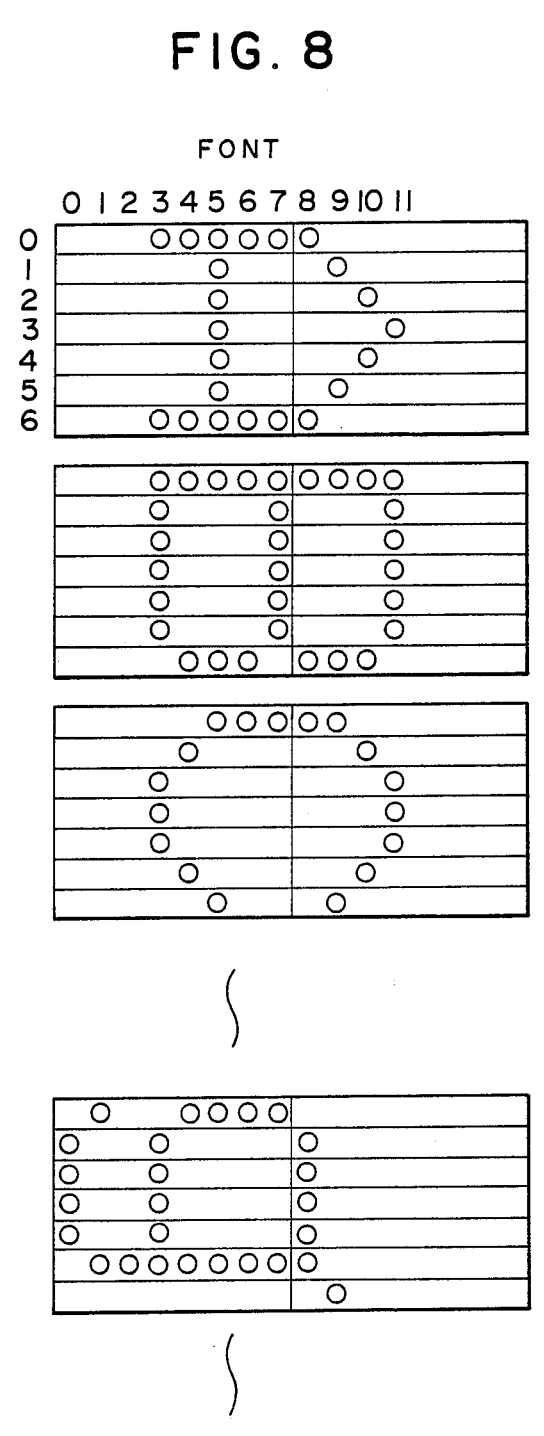

In this case, the characters are successively written one character at a time into the working memory 4 by the processing according to the writing program of FIG. 5 and the transverse font is read out by the processing according to the compression printing program of FIG. 6 thereby effecting the compression printing. In FIG. 6, after assigning values "zero" and "number of lines" respectively to the operands X and Y, the operation proceeds to the step of fetching character codes from the working memory position designated by the X and Y and then proceeds to the next step of extracting the character font from the character generator corresponding to the compression mode by using the character code as an index. In other words, according to the processing of FIG. 5 and 6, the controller 9 reads out the characters rowwise from the working memory 4 and the proper font corresponding to the compression ratio as shown at 12a or 12b in FIG. 2 is selected from the character generator 6. The font is then delivered to the output circuit 7 and finally the printer 8 prints out a transverse document. The contents of the character generator 6 includes various kinds of fonts corresponding to the respective compression ratios. FIGS. 7 and 8 show examples of such fonts. By selecting fonts of suitable sizes with suitable character spacings, it is possible to realize various compression ratios.

Figure 9:
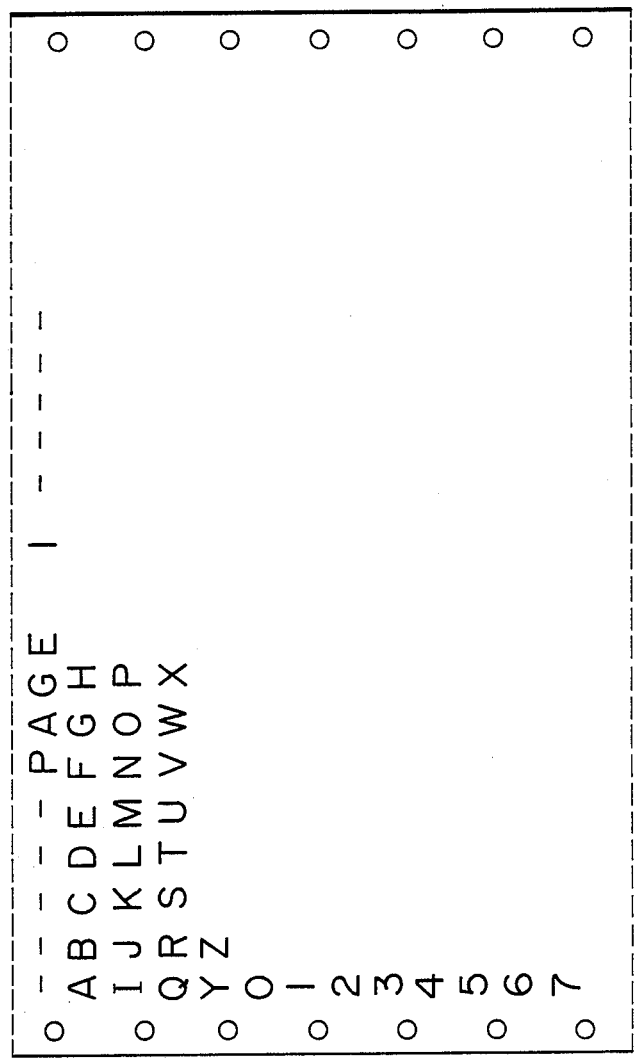
FIG. 9 shows a print obtained in a normal printing mode.
Figure 11:
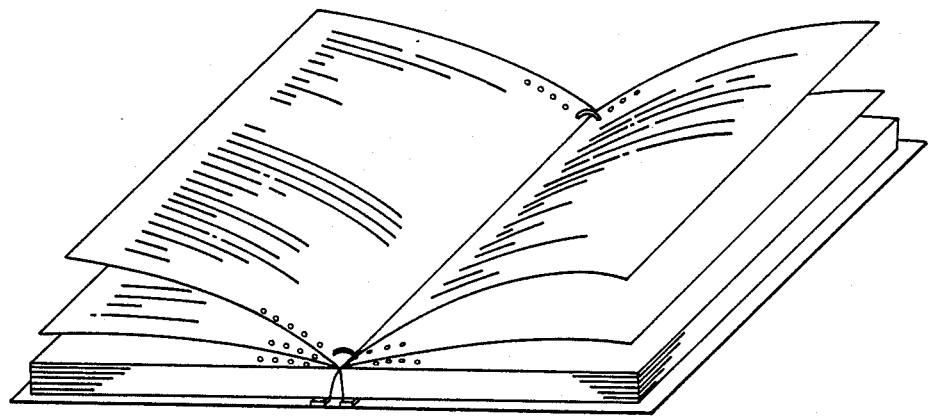
FIG. 11 shows the manner in which the prints obtained in the compression printing mode are held together by a binder.

Referring now to FIG. 9, an example of the normal printing which utilizes the bypass line 5 without performing the compression operation illustrated. In the condition where the print compressor 100 is connected as in this embodiment, it is possible to stop the compression printing operation by passing the characters through the bypass line 5. FIG. 10 shows an example of a compressed print. The Figure shows the print obtained with the compression ratio of 3:1, that is, with the characters for three pages of FIG. 9 accommodated within one page of FIG. 10. FIG. 11 shows the manner in which such compressed and printed papers are directly held together by a binder. By so doing, it is possible to turn the pages transversely as in the case of the ordinary books making their handling very easy and a print involving a large number of pages is made quite readily legible.

The various operations of the print compressor 100 are controlled in accordance with the output data from the control panel 10 or the computer 1 of FIG. 1. Its operating state is indicated on the display of the control panel 10.

Figure 12:
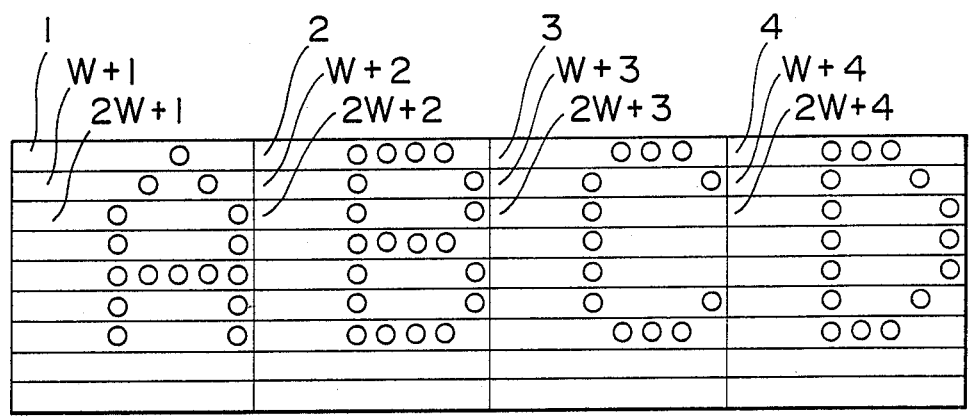
FIG. 12 shows another example of the character font of the character generator.

Then, the direction and arrangement of character data in the character generator 6 and the generator order of the font must be determined optimally in accordance with the printer 8 used. FIG. 12 shows another example of the font. With the data in the character generator 6, each row of the data is handles as a unit. Then, the data is generated in such a manner that if W represents the print width, 1 to W of the font are all generated and then followed by (W+1) to (2 W), (2 W+1) to (3 W), (3 W+1) to (4 W), etc., thereby delivering the data to the printer 8.

Also, with the overall construction of FIG. 1, it is possible to perform the desired compression printing operation without using the buffer 3.

From the foregoing description it will be seen that the present invention has a great effect that when printing the character data delivered successively from a data output equipment such as a computer, in accordance with the selected compression ratio and printing direction the printing is effected in a compressed form which effectively utilizes the print area of a printing paper in both of its column direction and row direction and moreover the result of the printing is readily legible even if a printout involves a large number of pages.

We claim:

1. A character printing-form compressing apparatus adapted to be connected between a data output equipment which successively generates character data to be printed, and a printer responsive to the character data to print corresponding characters in dot-matrix form, for selectively changing a printer printing form from one font to another font, said compressing apparatus comprising:
   command means for commanding a print-form compression ratio and a printing direction of said printer;
   working memory means for storing character data therein in a matrix form;

memory control means for controlling said memory means to store said character data from said data output equipment in a storing direction of said matrix, and controlling said memory means to output data stored therein in an outputting direction of said matrix different from said storing direction;

character generating means for retaining a plurality of compressed character fonts inclined by a predetermined angle, each corresponding to a print-form compression ratio and responsive to a print-form compression ratio command from said command means, for sequentially outputting character font data corresponding to the character data outputted from said working memory means; and control means, responsive to said character font data, to control said printer to print characters in a form compressed at the commanded compression ratio in the commanded printing direction commanded by said command means.

2. An apparatus according to claim 1, further comprising buffer memory means connected between said data output equipment and said working memory means.

3. An apparatus according to claim 1, further comprising data bypassing means for connecting the character data generated from said data output equipment through said control means directly to said printer.

4. An apparatus according to claim 2, wherein said command means includes means for selecting character data to be printed, and said memory control means includes means for reading out from said buffer memory means and storing the selected character data in a row direction and means for reading out stored character data from said working memory in a column direction.

5. An apparatus according to claim 4, wherein said character generating means includes means for converting said data outputted in the column direction into a compressed character font data which is laterally inclined by 90 degrees.

6. An apparatus according to claim 1, wherein said memory control means comprises an operation panel, and a microcomputer for controlling said working memory means.

7. A character printing-form compressing apparatus adapted to be connected between a data output equipment which successively generates character data to be printed, and a printer responsive to the character data to print corresponding characters in dot-matrix form, for compressing said character data into a smaller printing space, comprising:

working memory means for storing character data therein in a form having columns and rows;

memory control means for controlling said memory means to store said character data from said data output equipment in a column direction thereof, and controlling said memory means to output data stored therein in a row direction thereof;

character storing means connected to said working memory means for storing at least one compressed inclined character font which is inclined by 90 degrees, and for reading out a character font in said compressed/inclined character font corresponding to each said character data output by said working memory means; and means, responsive to said character font, to control said printer to print said characters.

8. A method of operating a character printing compressing apparatus which is adapted to be connected between data output equipment that successively generates character data to be printed and a printer responsive to the character data, comprising the steps of:

successively storing said character data in a working memory in a matrix form, said character data being stored in a first direction of said matrix;

reading out said character data from said working memory in a second direction of said matrix opposite to said first direction;

storing in advance at least one compressed/inclined character font which is inclined by 90 degrees as compared with said character data;

using said character data output by said working memory mean to access a character font in said compressed/inclined character font corresponding to said character data output; and controlling said printer to print a character corresponding to said character font in said compressed-/inclined font.

* * * * *